United States Patent [19]
Wiltshire

[11] Patent Number: 4,949,174
[45] Date of Patent: Aug. 14, 1990

[54] ZOOM LENS THERMAL IMAGER INCORPORATING A NON-PIXELLATED DETECTOR

[75] Inventor: Michael C. Wiltshire, High Wycombe, England

[73] Assignee: The General Electric Company, p.l.c., London, England

[21] Appl. No.: 314,574

[22] PCT Filed: Jun. 3, 1988

[86] PCT No.: PCT/GB88/00436
  § 371 Date: Feb. 1, 1989
  § 102(e) Date: Feb. 1, 1989

[87] PCT Pub. No.: WO88/10044
  PCT Pub. Date: Dec. 15, 1988

[30] Foreign Application Priority Data
  Jun. 3, 1987 [GB] United Kingdom ............... 8713023

[51] Int. Cl.⁵ .............................................. H04N 5/30
[52] U.S. Cl. ..................................... 358/113; 358/110
[58] Field of Search ............... 358/110, 113, 225, 227; 250/334, 331

[56] References Cited

U.S. PATENT DOCUMENTS 3,283,159 11/1966 Robbins ........................... 358/110 X
4,670,654 6/1987 Ross ................................. 358/113 X
4,687,933 8/1987 Loy ................................... 358/113 X

FOREIGN PATENT DOCUMENTS 0138398 4/1985 European Pat. Off. .
0171202 2/1986 European Pat. Off. .
0212928 3/1987 European Pat. Off. .
0083717 4/1987 Japan ................................ 358/110

Primary Examiner—Howard W. Britton
Assistant Examiner—Victor R. Kostak
Attorney, Agent, or Firm—Kirschstein, Ottinger, Israel & Schiffmiller

[57] ABSTRACT

A thermal imaging device comprises a non-pixellated detector (3) which includes a component (12), such as a liquid crystal element, having optical properties which vary with temperature. An infra-red lens (1) forms a focused image of a thermal scene on the non-pixellated detector. A visible light source (17) is arranged to illuminate the non-pixelled detector such that visible light from the source is modulated by the image formed on the non-pixellated detector. A second detector (7), such as a television camera chip, detects the modulated visible light to give an output which is representative of the image of the thermal scene. A visible light zoom lens (5) is interposed in the optical path between the non-pixellated detector and the second detector so that variation of the focal length of the zoom lens varies the field of view of the thermal imaging device.

14 Claims, 2 Drawing Sheets

ZOOM LENS THERMAL IMAGER INCORPORATING A NON-PIXELLATED DETECTOR

BACKGROUND OF THE INVENTION

1. Field of the Invention

This invention relates to thermal imaging devices, and in particular to optically-read thermal imaging devices.

2. Description of Related Art

Conventional thermal imaging devices include an infra-red sensitive detector and one or more infra-red optical components which focus the radiation from a thermal scene on to the surface of the detector. Devices of this type are described in patent application Ser. No. GB 2150387 and in our own patent application Ser. No. GB 2180361. The material of the detector is chosen to have a highly temperature-dependent optical property, such as birefringence or optical rotation. This detector is also illuminated by a visible or near-visible polarized light source the output of which is reflected off a dichroic mirror on to the detector. The visible or near-visible light experiences a modulation of polarisation, on passing through the detector, which is converted to an intensity modulation by a quarter-wave plate and an analyser. This intensity modulation conferred on the light passing through the detector thus corresponds to temperature variations induced in the detector by the infra-red radiation. In conventional devices, the modulated light is then focused by lenses through a Fourier plane filter on to a television camera chip the output of which is read into a frame store.

In order to vary the field of view of the device, an infra-red zoom lens must be used to focus the radiation from the thermal scene on to the liquid crystal. Infra-red lenses are expensive, and infra-red zoom lenses particularly so; so for any individual system, the range of lenses is usually limited.

SUMMARY OF THE INVENTION

It is an object of the present invention to provide a thermal imaging device in which the field of view may be varied, whilst avoiding the use of infra-red zoom lenses.

According to the present invention, a thermal imaging device comprises: a non-pixellated detector including a component the optical properties of which vary with temperature; means for forming a focused image of a thermal scene on said non-pixellated detector; a visible light source arranged to illuminate the non-pixellated detector such that visible light from the source is modulated by the image formed on the non-pixellated detector; a further detector effective to detect said modulated visible light, to give an output representative of the image of the thermal scene; and a visible light zoom lens interposed in the optical path between the non-pixellated detector and the further detector such that variation of the focal length of the lens varies the field of view of the thermal imaging device.

The component within the non-pixellated detector is suitably a liquid crystal; the material of the liquid crystal may exhibit temperature-dependent optical properties, such as birefringence or optical rotation.

Preferably the further detector which is effective to detect visible light is a pixellated detector such a a charge-coupled device of the kind used as a television camera chip. Alternatively a television vidicon may be used.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENTS

In both figures, the rays shown incident on a liquid crystal detector 3 are infra-red rays, whilst those emerging from the detector 3 are rays of visible light.

Figure 1:
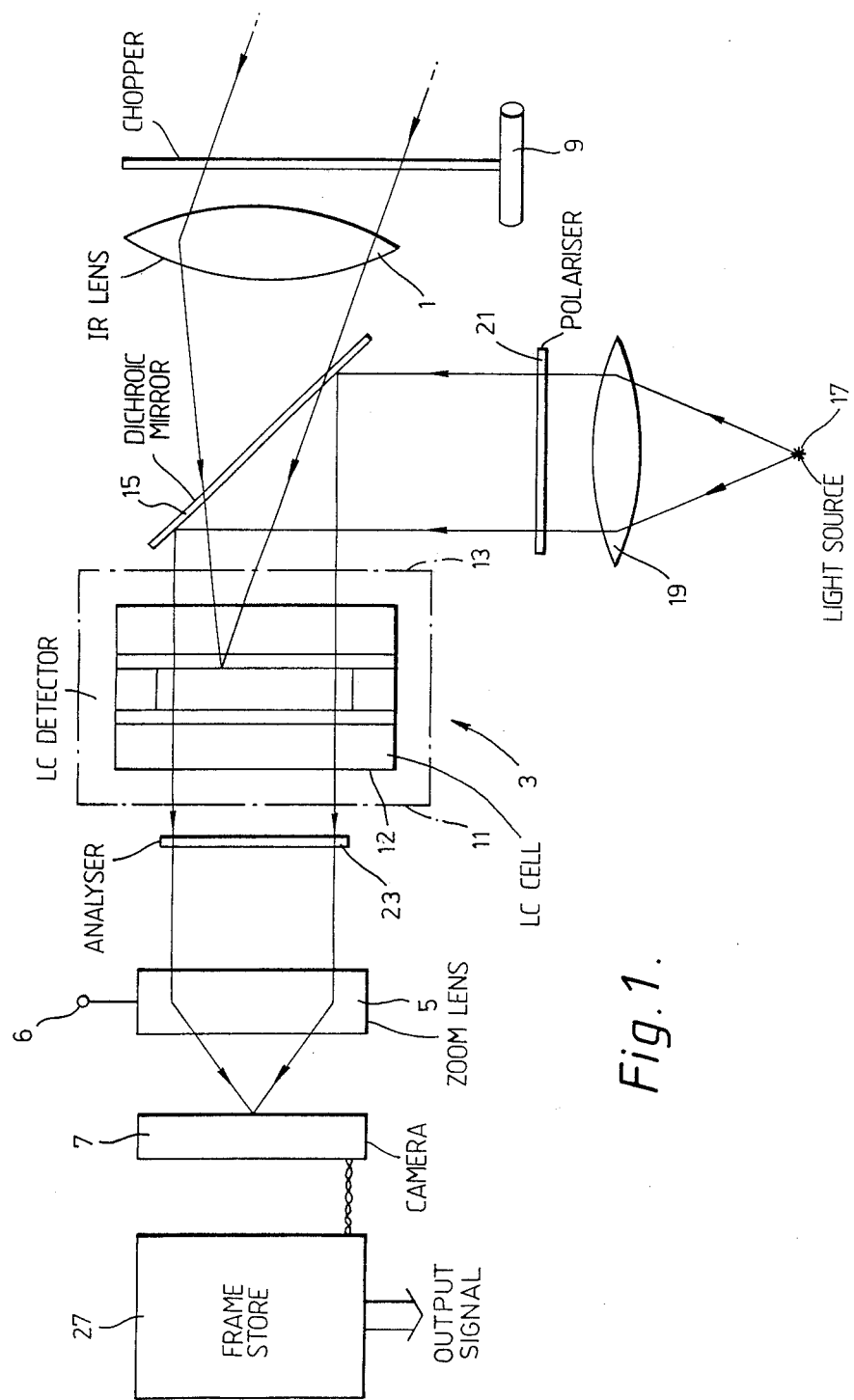
FIG. 1 is a schematic diagram of a thermal imaging device.

Referring first to FIG. 1, the device comprises means for forming a focused image of a thermal scene on to a detector 3, a visible light source 17 arranged to illuminate the detector 3, and a visible light zoom lens 5 interposed between the detector 3 and a television camera chip 7.

The means for forming a focused image of the thermal scene includes a chopper 9 which chops the infra-red radiation incident on an infra-red lens 1. This lens directs the radiation on to the full area of the detector 3.

To illuminate the detector 3, a visible light from the off-axis source 17 is converted into a parallel beam by a lens 19. The term 'visible light' as used herein is intended to include light in the near infra-red and near ultra-violet parts of the spectrum which can be transmitted without significant attenuation by conventional optical lenses which are substantially transparent to light which is visible to the human eye. A polarizer 21 is provided to polarise this beam in a direction parallel to the director of the liquid crystal which forms the thermo-optic component of the detector 3 and exhibits optical rotation. The polarised light is then incident on a dichroic mirror 15 placed adjacent to a wall 13 of a detector enclosure 11. The mirror 15 is so designed as to transmit infra-red radiation whilst reflecting radiation of other wavelengths, and is angled so as to direct light from the source 17 on to the detector 3.

The detector 3 includes a liquid crystal cell 12 contained within a temperature-controlled enclosure 11, at least one wall 13 of which is designed to be transparent to infra-red radiation emitted from a field of view to be imaged. The liquid crystal mixture in the cell 12 is formed from two cholesteric liquid crystals; cholesteryl chloride which has a right handed structure and cholesteryl myristate which has a left handed structure. The alignment of the liquid crystal mixture is such that the pitch of the liquid crystal helix may adopt its natural value at any particular temperature; in this way, the optical rotation experienced by light passing through the liquid crystal cell will be continuously variable as a function of temperature.

It is essential that the detector 3 should not be pixellated. In this case, the highest usable spatial frequency in the detector is determined by the lateral heat spread which acts to degrade the high spatial frequency variations in the detector temperature. Hence, the field of view and the angular resolution of the system are not related by the properties of the detector.

By means of the chopper 9, the detector 3 is alternately exposed to the thermal scene and a uniform temperature. The optical properties of the liquid crystal mixture in the cell 12 vary with temperature so that the polarisation of the visible light incident on the detector 3 is modulated on passing through the liquid crystal. This polarisation modulation is then converted to an intensity modulation as the light passes through an analyser 23.

A visible light zoom lens 5 subsequently focuses the intensity-modulated light from the detector 3 on to a pixellated television camera chip 7, the output of which is fed into a frame store 27. The successive light and dark frames formed in this way are subtracted from each other to provide a video output.

Figure 2:
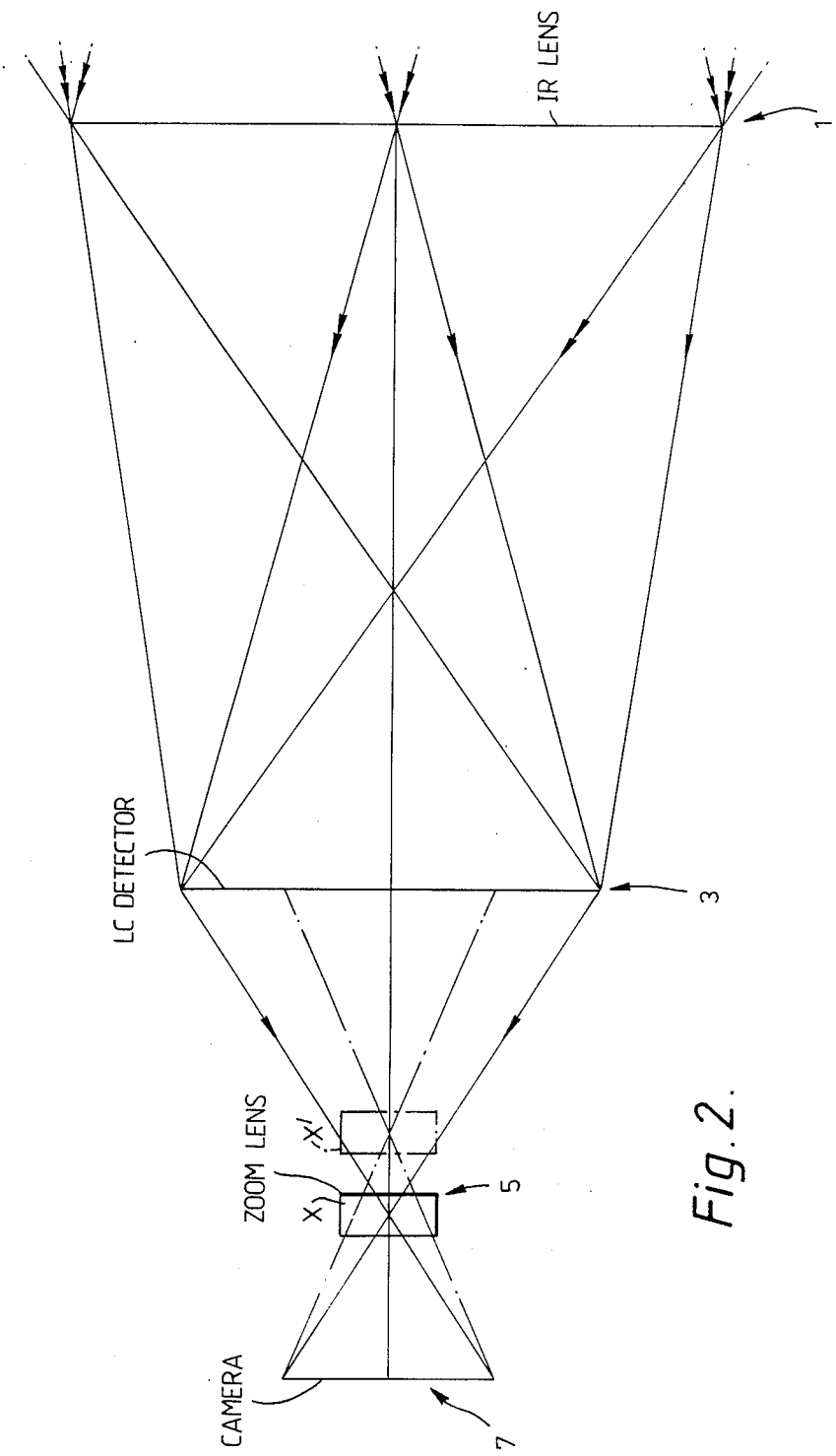
FIG. 2 is a ray diagram.

FIG. 2 shows the zoom lens 5 which focuses the thermal image formed at the detector 3 on to the television camera chip 7. The rays shown to the left of the detector 3 are visible light rays and those shown to the right are beams of infra-red radiation which are focused on the full area of the detector at all times. The zoom lens 5 in a position X focuses the full field of view on to the camera chip 7, whereas in a position $X^1$ a limited field of view is focused. In both cases the number of pixels in the camera chip 7 determines the spatial resolution. Position $X^1$ is chosen so that the spatial resolution set by the camera chip matches that available in the detector 3.

The zoom lens 5 can take away any conventional form and, as is illustrated in FIG. 1, it is provided with a control signal input 6 by means of which the field of view of the zoom lens 5 is altered. The effect of altering the field of view of a zoom lens is to increase or decrease its magnification. In the present case, the magnification cannot usefully be reduced beyond that represented by the position X, but it can be increased until only a small central portion of the detector 3 is within the field of view. It is under this latter condition that the non-pixellated nature of the detector 3 is of particular importance, as any pixellated structure would significantly impose itself on the magnified field of view.

Thus the field of view of a thermal image can be altered over a very wide range using a conventional visible-light zoom lens.

If the component of the non-pixellated detector exhibits birefringence, the polarizer is chosen to polarise the beam of visible light in a direction which is at 45° to the director of the liquid crystal. In this case, a quarter-wave plate is interposed between the detector and the analyser.

I claim:

1. A thermal imaging device, comprising a non-pixellated detector (3) including a component (12) the optical properties of which vary with temperature; means (1) for forming a focused image of a thermal scene on said non-pixellated detector; a visible-light source (17) arranged to illuminate the non-pixellated detector such that visible light from the source is modulated by the image formed on the non-pixellated detector; a further detector (7) effective to detect said modulated visible light to give an output representative of the image of the thermal scene; and a visible light zoom lens (5) interposed in the optical path between the non-pixellated detector and the further detector such that variation of the focal length of the lens varies the field of view of the thermal imaging device.

2. A thermal imaging device as claimed in claim 1, in which the component (12) of the non-pixellated detector (3) exhibits birefringence.

3. A thermal imaging device as claimed in claim 2, wherein the light source (17) is arranged off-axis and an inclined dichroic mirror (15) is arranged to deflect light from the source (17) onto the non-pixellated detector (3), the miror being arranged in the path of radiation incident on said non-pixellated detector.

4. A thermal imaging device as claimed in claim 1, in which the component (12) of the non-pixellated detector (3) exhibits optical rotation.

5. A thermal imaging device as claimed in claim 4, wherein the light source (17) is arranged off-axis and an inclined dichroic mirror (15) is arranged to deflect light from the source (17) onto the non-pixellated detector (3), the mirror being arranged in the path of radiation incident on said non-pixellated detector.

6. A thermal imaging device as claimed in claim 1, in which component (12) of the non-pixellated detector (3) is a liquid crystal.

7. A thermal imaging device as claimed in claim 1, in which the further detector (7) is a pixellated detector.

8. A thermal imaging device as claimed in claim 7, in which the pixellated detector (7) is a charge-coupled device.

9. A thermal imaging device as claimed in claim 8, in which the pixellated detector (7) is a television camera chip.

10. A thermal imaging device as claimed in claim 7, in which the pixellated detector (7) is a television camera chip.

11. A thermal imaging device as claimed in claim 7, wherein the light source (17) is arranged off-axis and an inclined dichroic mirror (15) is arranged to deflect light from the source (17) onto the non-pixellated detector (3), the mirror being arranged in the path of radiation incident on said non-pixellated detector.

12. A thermal device as claimed in claim 1, in which the further detector (7) is a television vidicon.

13. A thermal imaging device as claimed in claim 1, wherein the light source (17) is arranged off-axis and an inclined dichroic mirror (15) is arranged to deflect light from the souce (17) on to the non-pixellated detector (3), the mirror being arranged in the path of radiation incident on said non-pixellated detector.

14. A thermal imaging device as claimed in claim 1, wherein said non-pixellated detector (3) includes an analyser (23).

* * * * *